United States Patent [19]

Ohgi et al.

[11] Patent Number: 5,166,263

[45] Date of Patent: Nov. 24, 1992

[54] POLYVINYL ALCOHOL

[75] Inventors: Hiroyuki Ohgi; Toshiaki Sato, both of Kurashiki, Japan

[73] Assignee: Kuraray Co., Ltd., Kurashiki, Japan

[21] Appl. No.: 735,061

[22] Filed: Jul. 24, 1991

[30] Foreign Application Priority Data

Jul. 30, 1990 [JP] Japan .................................. 1-202681

[51] Int. Cl.$^5$ ............................................. C08F 16/06
[52] U.S. Cl. ........................................ 525/56; 525/62
[58] Field of Search ..................................... 525/56, 62

[56] References Cited

U.S. PATENT DOCUMENTS

| | | | |
|---|---|---|---|
| 3,063,787 | 11/1962 | Rynkiewicz et al. | 525/56 X |
| 3,102,775 | 9/1963 | Seeger | 525/56 X |
| 3,232,916 | 2/1966 | Fogle | 525/56 |
| 3,269,995 | 8/1966 | Fujii | 525/56 |
| 3,318,856 | 5/1967 | Deyrup | 525/56 X |
| 3,427,298 | 2/1969 | Tsuboi et al. | 525/56 X |
| 3,474,461 | 10/1969 | Otsu et al. | 525/56 X |
| 3,560,464 | 2/1971 | Toyoshima et al. | 525/56 X |
| 3,600,342 | 8/1971 | Nickerson et al. | 525/56 X |
| 3,626,027 | 12/1971 | Tanaka et al. | 525/56 |
| 3,850,901 | 11/1974 | Tanaka et al. | 525/56 |
| 4,293,473 | 10/1981 | Eastman | 525/56 X |
| 4,463,138 | 7/1984 | Wu et al. | 525/56 X |
| 4,713,290 | 12/1987 | Kwon et al. | 525/56 X |

FOREIGN PATENT DOCUMENTS 0389833  3/1990  European Pat. Off. .

OTHER PUBLICATIONS

Kolloid-Zeitschrift & Zeitschrift Fur Polymere, vol. 243, No. 1, 1971, "Mechanical denaturation of high polymers in solutions," K. Yamaura, Y. Hoe, S. Matsuzawa and Y. Go.

Journal of Applied Polymer Science, vol. 35, No. 5, 1988, John Wiley & Sons, Inc., Matsuzawa et al., "Properties of blends of syndiotactic-rich and atactic poly(vinyl alcohols)" pp. 1661–1665.

Chemical Abstracts, vol. 111, No. 12, Sep. 18, 1989, Columbus, OH, USA, Imai et al.

Chemical Abstracts, vol. 112, No. 20, May 14, 1990, Columbus, OH, Yamaura et al, "Properties of syndiotacticrich poly(vinyl) . . . )".

Chemical Abstracts, vol. 114, No. 26, Jul. 1, 1991, p. 84, Abstract No. 248 941u & JP-A2-03-30 820.

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Provided is a polyvinyl alcohol having a triad isotacticity of at least 72% and an intrinsic viscosity of at least 0.1 dl/g (deciliter/gram) as determined by measurement of solution viscosity in acetone at 30° C. of the polyvinyl acetate obtained by acetylation thereof. The polyvinyl alcohol of the present invention has a crystalline structure different from those of conventional isotactic polyvinyl alcohols and, as a result, exhibit excellent characteristics including high crystallinity and high melting point, as well as markedly high water resistance and thermal resistance. It has use as a high-strength fiber, high-water-resistant fiber, thermally resistant fiber and thermally resistant film.

3 Claims, 2 Drawing Sheets

//POLYVINYL ALCOHOL

BACKGROUND OF THE INVENTION

1. Field of the Invention

The present invention relates to a polyvinyl alcohol having a high stereoregularity, and more specifically to a novel polyvinyl alcohol having markedly high isotacticity.

2. Description of the Prior Art

Polyvinyl alcohol, which is one of a few crystalline water soluble polymers, has excellent interfacial characteristics and mechanical characteristics, and is hence used for processing paper and fibers and stabilizing emulsions, and also as a starting material for polyvinyl alcohol film and polyvinyl alcohol fiber. In recent years, development for its application to new fields has actively been conducted. For example polyvinyl alcohol has been attracting attention as a material for gel.

Commercially available polyvinyl alcohols have nearly atactic stereoregularity, i.e. a triad isotacticity of about 22%. The tacticity herein is determined by $^1$H-NMR spectrometry on a polyvinyl alcohol specimen solution in DMSO (dimethyl sulfoxide)-$d_6$. It is known that the resonance absorption of the hydroxyl groups of a polyvinyl alcohol in DMSO-$d_6$ is divided into 3 peaks attributable to, when counted from low magnetic field side, isotactic, heterotactic and syndiotactic each by triad expression, respectively. The ratio of the integrated areas of the peaks can determine the tacticity of the polyvinyl alcohol. With respect to the chemical shift of the peaks, while they shift depending on the measuring temperature, the peaks show a chemical shift at 35° C. of isotactic=4.63 ppm, heterotactic=4.45 ppm and syndiotactic=4.22 ppm (J. R. DeMember, H. C. Haas and R. L. MacDonald, J. Polym. Sci., Part B, 10, 385(1972)). The tacticities of various polyvinyl alcohols herein are those determined by this method unless otherwise specified.

The triad isotacticity of an isotactic polyvinyl alcohol as determined by $^1$H-NMR spectrometry on its solution in DMSO-$d_6$ was reported as 55% (J. R. DeMember, H. C. Haas and R. L. MacDonald, J. Polym. Sci., Part B, 10, 385(1972)). The above isotactic polyvinyl alcohol was obtained by a process proposed by Okamura et al (S. Okamura, T. Kodama and T. Higashimura, Macromol. Chem., 53, 180(1962)).

The triad isotacticity of an isotactic polyvinyl alcohol as determined by $^1$H-NMR spectrometry on its solution in DMSO-$d_6$ was reported as 70.2% (T. K. Wu and D. W. Ovenall, Macromolecules, 6, 582(1973)). The above polyvinyl alcohol was obtained by a process proposed by Murahashi et al (S. Murahashi, S. Nozakura and M. Sumi, J. Polym, Sci., Part B, 3, 245(1965)). No polyvinyl alcohol having an isotacticity higher than the above has however been obtained yet.

The polyvinyl alcohol obtained by the above process and having an isotacticity of 55% has lower thermal resistance, crystallinity and melting point than conventional polyvinyl alcohol having an isotacticity of 22% and is soluble in cool water, thus showing reduced water resistance. The above polyvinyl alcohol having an isotacticity of 70.2% has been found to have higher melting point and improved water resistance as compared with the polyvinyl alcohol having an isotacticity of 55%, but it is still unsatisfactory with respect to melting point, crystallinity, water resistance, thermal resistance and the like.

SUMMARY OF THE INVENTION

It has been very difficult to apply the above isotactic polyvinyl alcohol having an isotacticity of 55% to industrial fields since it has markedly inferior characteristics including water resistance and thermal resistance to commercially available polyvinyl alcohols having an isotacticity of 22%, although it is excellent in solubility and processability. The polyvinyl alcohol having an isotacticity of 70.2% is known to be insoluble in cool water but requires further improvement in water resistance and thermal resistance.

Under these circumstances, an object of the present invention is to provide a novel polyvinyl alcohol having, while maintaining the excellent characteristics in processability and the like possessed by the conventional isotactic polyvinyl alcohol, markedly higher water resistance, thermal resistance and various other properties as compared with commercially available polyvinyl alcohols having an isotacticity of 22%.

As a result of an intensive study, the present inventors have found a polyvinyl alcohol having a triad isotacticity of at least 72% and an intrinsic viscosity of at least 0.1 dl/g (deciliter/gram) as determined by measurement of solution viscosity in acetone at 30° C. of the polyvinyl acetate obtained by acetylation thereof.

DETAILED DESCRIPTION OF THE PREFERRED EMBODIMENTS

Figure 1:
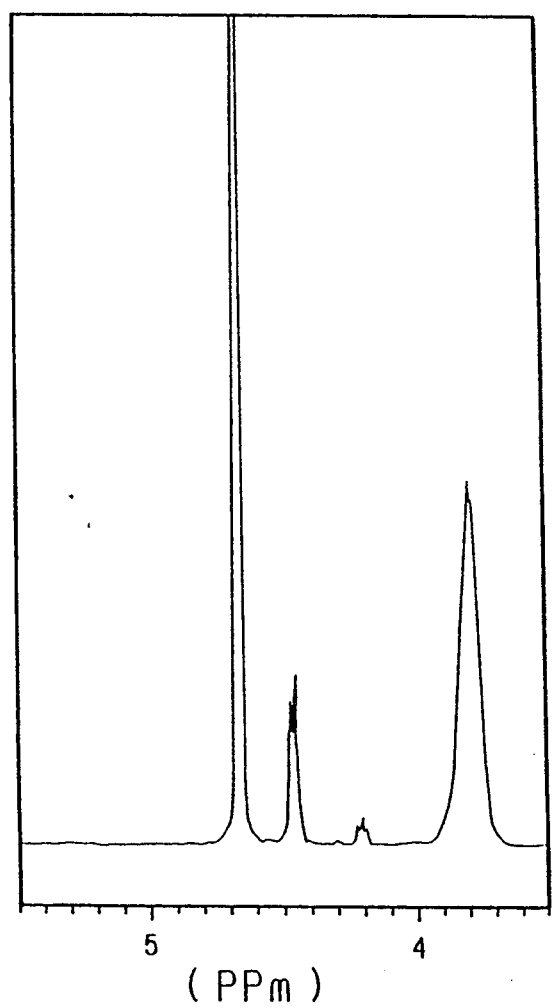
FIG. 1 shows a $^1$H-NMR spectrum of the polyvinyl alcohol obtained in Example 1.
Figure 2:
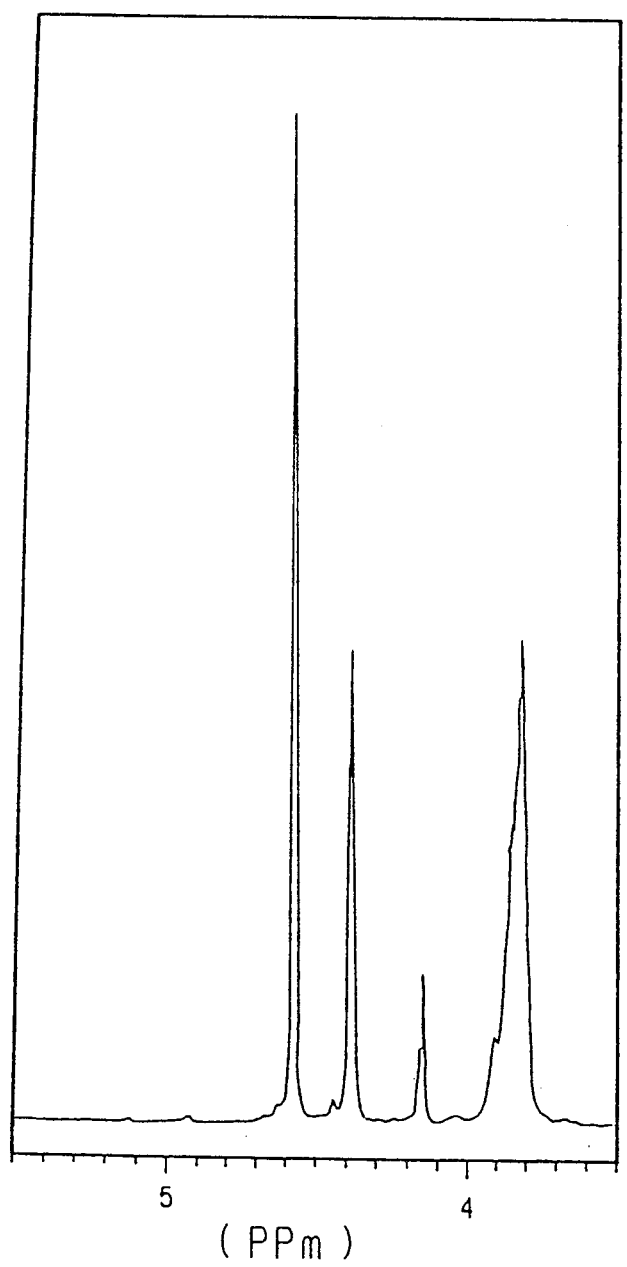
FIG. 2 shows that of the polyvinyl alcohol obtained in Comparative Example 1.

The polyvinyl alcohol of the present invention comprises vinyl alcohol units and preferably consists essentially of vinyl alcohol units. The contents of vinyl alcohol units in the polyvinyl alcohol of the present invention is at least 90 mol %, preferably at least 95 mol %, more preferably at least 99 mol %. The polyvinyl alcohol has a triad isotacticity of at least 72%, preferably at least 74%, more preferably at least 76%. The isotacticity possessed by the polyvinyl alcohol has no specific upper limit, but is generally selected appropriately from among not more than 95%, not more than 90%, not more than 85% and not more than 80%, depending on the intended use of the polymer.

The degree of polymerization of the polyvinyl alcohol of the present invention is herein expressed by the intrinsic viscosity determined by measurement of solution viscosity in acetone at 30° C. of the polyvinyl acetate obtained by acetylation of the polyvinyl alcohol. The polyvinyl acetate obtained by acetylation of the polyvinyl alcohol of the present invention has the intrinsic viscosity of at least 0.1 dl/g, preferably at least 0.5 dl/g, more preferably at least 1.0 dl/g. The intrinsic viscosity has no specific upper limit, but, in view of the fact that too high an intrinsic viscosity will render the polyvinyl alcohol difficult to process, it is preferably not more than 15 dl/g, and selected from this range or from not more than 10 dl/g, not more than 7 dl/g or not more than 5 dl/g depending on the intended use of the polyvinyl alcohol. The polyvinyl alcohol of the present invention may have any melting point but preferably has one of at least 237° C., more preferably at least 240° C.

The melting point of the polyvinyl alcohol of the present invention is determined by differential scanning calorimetry on its film obtained by casting its solution in dimethyl sulfoxide.

There are no specific limitations with respect to the process for producing the polyvinyl alcohol of the present invention and an example of the process is described below. Polymerization of a monomer of t-butyl vinyl ether in a nonpolar solvent of toluene is conducted at a temperature of not higher than −78° C. with a polymerization initiator of cationic trifluoroboron-ethyl ether complex in a concentration of 0.1 to 0.5 mmole/liter (millimole/liter), to obtain a polyvinyl ether. The polyvinyl ether obtained is dissolved in a solvent such as toluene, and hydrogen bromide is bubbled into the obtained solution at a temperature of 0° C. or below.

The process of this example is based on the finding, as a result of an intensive study made by the present inventors, that reduction of the amount of the polymerization catalyst to 0.1 to 0.5 mmole/l from that (2 to 7 mmoles/l) used in the process proposed by Okamura et al and strict control of water content in the polymerization solvent used can give a polyvinyl alcohol having an isotacticity of at least 72% and markedly higher degree of polymerization than conventional isotactic polyvinyl alcohols.

According to the present invention, there is provided a novel polyvinyl alcohol having, while maintaining the excellent characteristics in processability and the like possessed by the conventional isotactic polyvinyl alcohol, markedly higher water resistance, thermal resistance and various other properties as compared with commercially available and nearly atactic polyvinyl alcohols.

The polyvinyl alcohol of the present invention has, due to its higher isotacticity as compared with conventional isotactic polyvinyl alcohols, a crystalline structure different from that of the conventional isotactic polyvinyl alcohols, and as a result has distinguished properties including high crystallinity and high melting point, as well as markedly high water resistance and thermal resistance.

The novel polyvinyl alcohol of the present invention is characterized by having high water resistance and thermal resistance in addition to the above-mentioned excellent processability, and therefore can be suitably used in fields that can make use of its characteristic features, as well as in the fields where conventional isotactic polyvinyl alcohols cannot be used due to their inferior water resistance or thermal resistance. Examples of these uses are high-strength fiber, high-water-resistance fiber, thermally resistant fiber and thermally resistant film, and the polyvinyl alcohol has excellent industrial value.

Other features of the invention will become apparent in the course of the following descriptions of exemplary embodiments which are given for illustration of the invention and are not intended to be limiting thereof.

EXAMPLES

EXAMPLE 1

A glass vessel equipped with a stirrer was subjected to repeated steps of pressurizing with nitrogen gas and evacuation with heating, to be substituted with nitrogen gas. The vessel was charged with 2,300 ml of dewatered and distilled toluene having dissolved 0.073 ml (milliliter) of trifluoroborn-ethyl ether complex ($BF_3.OEt_2$; made by Wako Pure Chemical Industries, Ltd.) as a polymerization initiator and cooled in a dry ice/acetone cooling bath. When the inside temperature reached −78° C., 120 ml of dewatered and distilled t-butyl vinyl ether monomer was added, to start polymerization. After 3 hours, 120 ml of methanol was added to the system to terminate polymerization, and the contents were thrown into a large volume of methanol to recover the resultant polymer, which was then dried in vacuo at 60° C. The polymer thus obtained weighed 93.6 g, showing a yield of 97.4%.

In 5,000 ml of toluene was dissolved 20 g of the obtained polymer and the solution was stirred well in an ice bath at 0° C. with hydrogen boride gas being blown thereinto. About 3 minutes after the start of the reaction, the polyvinyl alcohol that formed precipitated and the system got white-turbid. After hydrogen boride had been blown into for further 7 minutes, the precipitated polymer was separated by filtration, neutralized with ammonia/methanol, washed with methanol and Soxhlet-washed with methanol, to give a polyvinyl alcohol.

The polyvinyl alcohol thus obtained was dissolved in DMSO-$d_6$ and analyzed by $^1$H-NMR spectrometry, to show a content of vinyl alcohol units of at least 99.9 mol % and an isotacticity of 78.1%. The polyvinyl acetate obtained by acetylation of the polyvinyl alcohol was tested for intrinsic viscosity in acetone at 30° C., to give one of 4.10 dl/g.

EXAMPLE 2

A glass vessel equipped with a stirrer was subjected to repeated steps of pressurizing with nitrogen gas and evacuation with heating, to be substituted with nitrogen gas. The vessel was charged with 2,300 ml of dewatered and distilled toluene having dissolved 0.074 ml of trifluoroboron-ethyl ether complex as a polymerization initiator and cooled in a dry ice/acetone cooling bath. When the inside temperature reached −78° C., 120 ml of dewatered and distilled t-butyl vinyl ether monomer was added, to start polymerization. After 3 and half hours, 240 ml of methanol was added to the system to terminate polymerization, and the contents were thrown into a large volume of methanol to recover the resultant polymer, which was then dried in vacuo at 60° C. The polymer thus obtained weighed 81.8 g, showing a yield of 85.2%.

In 5,000 ml of toluene was dissolved 40 g of the obtained polymer and the solution was stirred well in an ice bath at 0° C. with hydrogen boride gas being blown thereinto. About 3 minutes after the start of the reaction, the polyvinyl alcohol that formed precipitated and the system got white-turbid. After hydrogen boride had been blown into for further 7 minutes, the precipitated polymer was separated by filtration, neutralized with ammonia/methanol, washed with methanol and Soxhlet-washed with methanol, to give a polyvinyl alcohol.

The polyvinyl alcohol thus obtained was dissolved in DMSO-$d_6$ and analyzed by $^1$H-NMR spectrometry, to show a content of vinyl alcohol units of at least 99.9 mol % and an isotacticity of 78.8%. The polyvinyl acetate obtained by acetylation of the polyvinyl alcohol was tested for intrinsic viscosity in acetone at 30° C., to give one of 1.89 dl/g.

EXAMPLE 3

A glass vessel equipped with a stirrer was subjected to repeated steps of pressurizing with nitrogen gas and evacuation with heating, to be substituted with nitrogen gas. The vessel was charged with 54 ml of dewatered and distilled toluene having dissolved 0.0018 ml of trifluoroboron-ethyl ether complex as a polymerization initiator and cooled in a dry ice/acetone cooling bath. When the inside temperature reached −78° C., 6 ml of previously dewatered and distilled t-butyl vinyl ether monomer was added, to start polymerization. After 3 hours, 15 ml of methanol was added to the system to terminate polymerization, and the contents were thrown into a large volume of methanol to recover the resultant polymer, which was then purified by reprecipitation from toluene/methanol and dried in vacuo at 60° C. The polymer thus obtained weighed 3.9 g, showing a yield of 81.0%.

In 200 ml of toluene was dissolved 2 g of the obtained polymer and the solution was stirred well in an ice bath at 0° C. with hydrogen boride gas being blown thereinto. About 1 minutes after the start of the reaction, the polyvinyl alcohol that formed precipitated and the system got white-turbid. After hydrogen boride had been blown into for further 4 minutes, the precipitated polymer was separated by filtration, neutralized with ammonia/methanol, washed with methanol and Soxhlet-washed with methanol, to give a polyvinyl alcohol.

The polyvinyl alcohol thus obtained was dissolved in DMSO-$d_6$ and analyzed by $^1$H-NMR spectrometry, to show a content of vinyl alcohol units of at least 99.9 mol % and an isotacticity of 76.3%. The polyvinyl acetate obtained by acetylation of the polyvinyl alcohol was tested for intrinsic viscosity in acetone at 30° C., to give one of 1.71 dl/g.

EXAMPLE 4

A glass vessel equipped with a stirrer was subjected to repeated steps of pressurizing with nitrogen gas and evacuation with heating, to be substituted with nitrogen gas. The vessel was charged with 1,420 ml of dewatered and distilled toluene having dissolved 0.092 ml of trifluoroboron-ethyl ether complex as a polymerization initiator and cooled in a constant-low-temperature bath. When the inside temperature reached −93° C., 75 ml of dewatered and distilled t-butyl vinyl ether monomer was added, to start polymerization. After 2 and half hours, 60 ml of methanol was added to the system to terminate polymerization, and the contents were thrown into a large volume of methanol to recover the resultant polymer, which was then dried in vacuo at 60° C. The polymer thus obtained weighed 46.5 g, showing a yield of 77.5%.

In 5,000 ml of toluene was dissolved 20 g of the obtained polymer and the solution was stirred well in an ice bath at 0° C. with hydrogen boride gas being blown thereinto. About 3 minutes after the start of the reaction, the polyvinyl alcohol that formed precipitated and the system got white-turbid. After hydrogen boride had been blown into for further 7 minutes, the precipitated polymer was separated by filtration, neutralized with ammonia/methanol, washed with methanol and Soxhlet-washed with methanol, to give a polyvinyl alcohol.

The polyvinyl alcohol thus obtained was dissolved in DMSO-$d_6$ and analyzed by $^1$H-NMR spectrometry, to show a content of vinyl alcohol units of at least 99.9 mol % and an isotacticity of 74.0%. The polyvinyl acetate obtained by acetylation of the polyvinyl alcohol was tested for intrinsic viscosity in acetone at 30° C., to give one of 5.43 dl/g.

COMPARATIVE EXAMPLE 1

A glass vessel equipped with a stirrer was subjected to repeated steps of pressurizing with nitrogen gas and evacuation with heating, to be substituted with nitrogen gas. The vessel was charged with 53 ml of dewatered and distilled toluene having dissolved 0.0092 ml of trifluoroboron-ethyl ether complex as a polymerization initiator and cooled in a dry ice/acetone cooling bath. When the inside temperature reached −78° C., 6 ml of previously dewatered and distilled t-butyl vinyl ether monomer was added, to start polymerization. After 3 hours, 15 ml of methanol was added to the system to terminate polymerization, and the contents were thrown into a large volume of methanol to recover the resultant polymer, which was then purified by reprecipitation from toluene/methanol and dried in vacuo at 60° C. The polymer thus obtained weight 3.9 g, showing a yield of 81.0%.

In 350 ml of toluene was dissolved 3.5 g of the obtained polymer and the solution was stirred well in an ice bath at 0° C. with hydrogen boride gas being blown thereinto. About 1 minute after the start of the reaction, the polyvinyl alcohol that formed precipitated and the system got white-turbid. After hydrogen boride had been blown into for further 4 minutes, the precipitated polymer was separated by filtration, neutralized with ammonia/methanol, washed with methanol and Soxhlet-washed with methanol, to give a polyvinyl alcohol.

The polyvinyl alcohol thus obtained was dissolved in DMSO-$d_6$ and analyzed by $^1$H-NMR spectrometry, to show a content of vinyl alcohol units of at least 99.9 mol % and an isotacticity of 56.0%. The polyvinyl acetate obtained by acetylation of the polyvinyl alcohol was tested for intrinsic viscosity in acetone at 30° C., to give one of 0.63 dl/g.

The polyvinyl alcohols obtained in the above Examples and Comparative Example were tested for solubility in water or DMSO, water resistance, thermal resistance, melting point and crystallinity. The results are summarized in Table 1.

Obviously, numerous modifications and variations of the invention are possible in light of the above teachings. It is therefore to be understood that within the scope of the appended claims the invention may be practiced otherwise than as specifically described herein.

TABLE 1

|   | Solubility in water[1] | Solubility in DMSO[2] | Water resistance[3] (Swelling degree) | Thermal resistance[4] (E'50° C./ E'150° C.) | Melting point[5] (°C.) | Crystallinity[6] |
|---|---|---|---|---|---|---|
| Example 1 | Insoluble in hot water at 150° C. | Insoluble by heating at 120° C. | 0.75 | 5.2 | 249 | High |
| Example 2 | Soluble in hot water at 140° C. | Soluble by heating at 80° C. | 0.77 | 5.4 | 241 | High |

TABLE 1-continued

|  | Solubility in water[1] | Solubility in DMSO[2] | Water resistance[3] (Swelling degree) | Thermal resistance[4] (E'50° C./ E'150° C.) | Melting point[5] (°C.) | Crystallinity[6] |
|---|---|---|---|---|---|---|
| Example 3 | Soluble in hot water at 120° C. | Soluble by heating at 80° C. | 0.79 | 6.0 | 240 | High |
| Example 4 | Insoluble in hot water at 150° C. | Insoluble by heating at 120° C. | 0.80 | 6.5 | 241 | High |
| Comp. Ex. 1 | Soluble in hot water at 50° C. | Soluble by heating at 80° C. | Could not be measured | 69.0 | 215 | Low |

[1] The solubility was tested by immersing a specimen in water (concentration: 1% by weight, no stirring) and then heating the mixture in a pressure-proof vessel at a step-wise temperature elevation by 10° C., from 50° C. to 150° C.
[2] The solubility was tested by immersing a specimen in DMSO (concentration: 1% by weight, no stirring) and then heating the mixture in a pressure-proof vessel at a step-wise temperature elevation by 10° C., from 50° C. to 120° C.
[3] The swelling of a specimen film having been immersed in water at 30° C. for 24 hours.
[4] Temperature dependency of the dynamic viscoelastic behavior of a specimen film. E'50° C./E'150° C. means the ratio between the storage elasticities at 50° C. and 150° C.
[5] Determined by DSC.
[6] Relative value of the degree of crystallinity obtained by wide-angle X-ray scattering.

What is claimed is:

1. A polyvinyl alcohol having a triad isotacticity of at least 72% and an intrinsic viscosity of at least 0.1 dl/g as determined by measurement of solution viscosity in acetone at 30° C. of the polyvinyl acetate obtained by acetylation thereof.

2. A polyvinyl alcohol according to claim 1, having a triad isotacticity of at least 74%.

3. A polyvinyl alcohol according to claim 1, said polyvinyl alcohol having a melting point of at least 237° C.

* * * * *

UNITED STATES PATENT AND TRADEMARK OFFICE
CERTIFICATE OF CORRECTION

PATENT NO. : 5,166,263

DATED : November 24, 1992

INVENTOR(S) : Hiroyuki Ohgi, et al.

It is certified that error appears in the above-identified patent and that said Letters Patent is hereby corrected as shown below:

On the title page, item (30) Foreign Application Priority Data, change "1-202681" to --2-202681--.

Signed and Sealed this

Twenty-first Day of December, 1993

*Attest:*

BRUCE LEHMAN

*Attesting Officer*     *Commissioner of Patents and Trademarks*